United States Patent [19]

Melograne

[11] Patent Number: 5,657,161

[45] Date of Patent: Aug. 12, 1997

[54] DUAL POLARIZED FILTERS TO ELIMINATE CANOPY REFLECTIONS

[75] Inventor: Raymond F. Melograne, N. Massapequa, N.Y.

[73] Assignee: Northrop Grumman Corporation, Los Angeles, Calif.

[21] Appl. No.: 559,381

[22] Filed: Nov. 15, 1995

[51] Int. Cl.⁶ .......................... G02B 5/30; G02B 27/00; G03B 21/14; B60J 3/00
[52] U.S. Cl. .................... 359/501; 359/229; 359/493; 359/601; 296/97.1; 353/20
[58] Field of Search .......................... 359/13, 229, 493, 359/501, 601, 602, 608, 614; 296/97.1, 97.2, 97.9, 97.12; 345/7; 353/20

[56] References Cited

U.S. PATENT DOCUMENTS

| | | | |
|---|---|---|---|
| 3,760,215 | 9/1973 | Sach | 313/92 |
| 3,897,033 | 7/1975 | Harding et al. | 350/276 |
| 3,915,548 | 10/1975 | Opittek et al. | 350/3.5 |
| 4,310,242 | 1/1982 | Genco et al. | 356/128 |
| 4,328,532 | 5/1982 | Smith | 362/19 |
| 4,418,377 | 11/1983 | Tamura | 362/19 |
| 4,515,442 | 5/1985 | Aron | 350/397 |
| 4,592,620 | 6/1986 | Poole | 350/174 |
| 4,723,160 | 2/1988 | Connelly | 358/103 |
| 4,776,692 | 10/1988 | Kalawsky | 356/239 |
| 5,057,744 | 10/1991 | Barbier et al. | 315/10 |
| 5,128,678 | 7/1992 | Novak et al. | 342/2 |
| 5,200,844 | 4/1993 | Suvada | 359/40 |
| 5,264,916 | 11/1993 | Bushman | 356/364 |
| 5,297,761 | 3/1994 | Kendall, Jr. et al. | 244/140 |
| 5,552,935 | 9/1996 | Knoll et al. | 359/630 |

*Primary Examiner*—Paul M. Dzierzynski
*Assistant Examiner*—Darren E. Schuberg

[57] ABSTRACT

A system is provided for eliminating light reflections within the cockpit of a vehicle having a canopy with a reflective interior surface. A first polarizing filter overlies a lighted display, enabling an occupant of the vehicle viewing the display to read information presented thereon. A second polarizing filter oriented 90° out of phase with respect to the first filter is interposed in the cockpit in a line of sight between the occupant and reflections off the reflective interior surface of the canopy which initiate at the display thereby preventing the reflections from being seen by the occupant without affecting the ability of the occupant to see the lighted display. Preferably, the polarizing filters lie in substantially parallel spaced planes. Also, each polarizing filter may be mounted for movement between active and inactive positions. In another embodiment, first and second occupants may be positioned in a tandem relationship with the second polarizing filter being interposed in the cockpit in a line of sight between the second occupant and the reflections. In this latter instance, a transparent substrate may be interposed in the cockpit separating the first and second occupants with the second polarizing filter being mounted on the substrate.

10 Claims, 1 Drawing Sheet

DUAL POLARIZED FILTERS TO ELIMINATE CANOPY REFLECTIONS

BACKGROUND OF THE INVENTION

1. Field of the Invention

This invention relates generally to a system for eliminating unwanted light reflections within the cockpit of a vehicle having a canopy with a reflective interior surface and, more particularly, those light reflections which interfere with the ability to read information presented on a lighted display.

2. Discussion of the Prior Art

Over the years, there have been numerous attempts, many successful, for improving the ability, for example, of a pilot or other crew member of an aircraft to read displays presenting information of interest to the pilot or crew member. Throughout the instant disclosure, the terms "cockpit", "canopy" and "aircraft" are intended to refer more broadly to any vehicle with a substantially enclosed region in which an occupant has need to read displays, instrumentation, and the like, without interference from reflections, as from internal surfaces of the enclosed region, wherever they are located. Furthermore, the term "lighted display" is intended to mean any distinct display of intelligent information, whether lighted or not.

The following are typical patented devices and systems which are known to the inventor and which relate generally to the field of the present invention.

Head-up display systems which project an image of information onto a combining plate in the field of view of a pilot to permit the pilot to view the information while continuing to view the terrain over which he is flying have long been known and are disclosed, for example, in U.S. Pat. Nos. 4,592,620 to Poole and U.S. Pat. No. 3,915,548 to Opittek et al.

U.S. Pat. No. 4,723,160 to Connelly discloses a system for improving upon symbol position error due to windscreen angular deviation in a head-up display.

In this regard, each of the U.S. Pat. No. 4,776,692 to Kalawsky and U.S. Pat. No. 4,310,242 to Genco discloses a system for testing the optical quality of a light transmitting article, for example, an aircraft cockpit canopy.

Also, U.S. Pat. No. 5,057,744 issued Oct. 15, 1991 to Barbier et al. discloses a system for improving the readability of displayed information by adjusting for fluctuations in the light environment.

Each of the U.S. Pat. No. 5,128,678 to Novak et al. and to U.S. Pat. No. 3,897,033 to Harding et al. generally discloses a detection avoidance system which provides optimum visibility through a canopy of an aircraft cockpit. The former patent relates to minimizing microwave energy reflection and the later patent to sunlight reflection.

While U.S. Pat. No. 5,264,916 issued to Bushman discloses apparatus including a polarizer for detecting distant objects, each of the following U.S. patents discloses filter apparatus including, in each instance, a polarizing filter for improving visibility of an instrument mounted in a vehicle, for example, an aircraft: U.S. Pat. No. 5,200,844 to Suvada; U.S. Pat. No. 4,515,442 to Aron; U.S. Pat. No. 4,418,377 to Tamura, U.S. Pat. No. 4,328,532 Smith, and U.S. Pat. No. 3,760,215 to Sach. It is noteworthy that Suvada utilizes a pair of polarizing filters, although not for the purpose with which the present invention is concerned.

SUMMARY OF THE INVENTION

It was in light of the prior art as just described that the present invention was conceived and has now been reduced to practice. According to the present invention, a system is provided for eliminating light reflections within the cockpit of a vehicle having a canopy with a reflective interior surface. A first polarizing filter overlies a lighted display, enabling an occupant of the vehicle viewing the display to read information presented thereon. A second polarizing filter oriented 90° out of phase with respect to the first filter is interposed in the cockpit in a line of sight between the occupant and reflections off the reflective interior surface of the canopy which initiate at the display thereby preventing the reflections from being seen by the occupant without affecting the ability of the occupant to see the lighted display. Preferably, the polarizing filters lie in substantially parallel spaced planes. Also, each polarizing filter may be mounted for movement between active and inactive positions. In another embodiment, first and second occupants may be positioned in a tandem relationship with the second polarizing filter being interposed in the cockpit in a line of sight between the second occupant and the reflections. In this latter instance, a transparent substrate may be interposed in the cockpit separating the first and second occupants with the second polarizing filter being mounted on the substrate.

Accordingly, a primary object of the present invention is to provide a novel technique for eliminating light reflections within the cockpit of a vehicle having a canopy with a reflective interior surface.

Another object of the invention is to provide a novel system for performing the technique of the invention.

A further object of the invention is to provide a such a novel system which employs a first polarizing filter overlying a lighted display and enables the occupant of the vehicle viewing said display to read the information presented thereon and a second polarizing filter oriented 90° out of phase with respect to said first polarizing filter and interposed in the cockpit in a line of sight between the occupant and reflections off the reflective interior surface of the canopy which initiate at said display to thereby prevent the reflections from being seen by the occupant without affecting the ability of the occupant to see the lighted display.

Still another object of the invention is to provide such a novel system in which the polarizing filters can be retracted to an inactive position when not needed.

Other and further features and advantages of the present invention will become more apparent from the following detailed description, taken in conjunction with the accompanying drawings which illustrate, by way of example, the principles of the invention. Throughout the specification, like numerals refer to like parts.

BRIEF DESCRIPTION OF THE DRAWINGS

The accompanying drawings illustrate the invention. In such drawings wherein like numerals refer to like parts.

DETAILED DESCRIPTION OF THE PREFERRED EMBODIMENT

Figure 1:
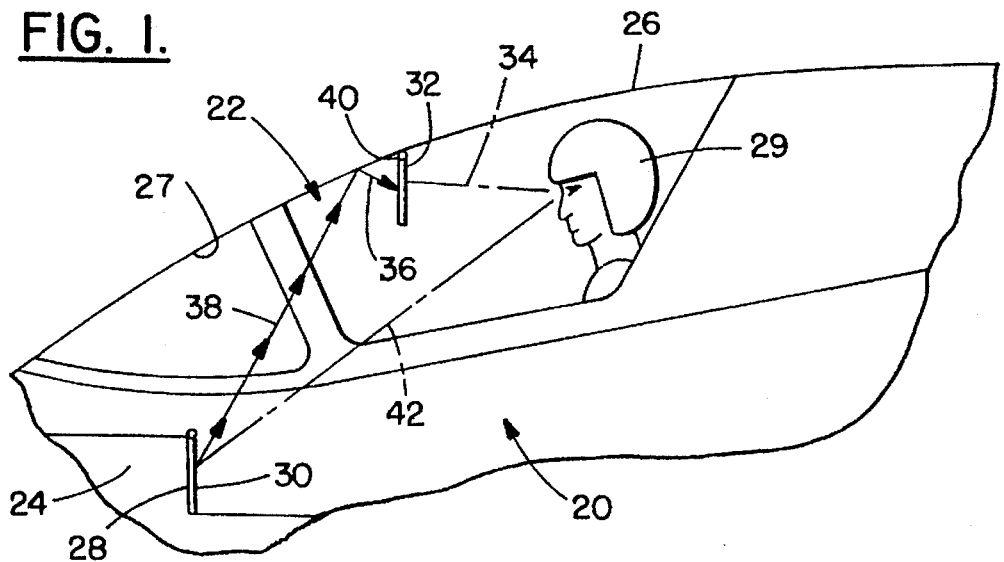
FIG. 1 is a diagrammatic side elevational view illustrating the cockpit of a vehicle modified in accordance with the present invention.

Turn now to the exemplary drawings and, initially, to FIG. 1 which diagrammatically illustrates a system 20 for eliminating light reflections within a cockpit 22 of a vehicle 24 such as an aircraft having a canopy 26 with a reflective interior surface 27. A lighted display 28 is suitably mounted for presenting information of interest to an occupant 29 of the vehicle, generally relating to operation of the vehicle or to surrounding phenomena.

According to the invention, a first polarizing filter 30 is positioned to overlie the lighted display 28 and enables the occupant 29 viewing the display to read the information presented thereon. A second polarizing filter 32 oriented 90° out of phase with respect to the first polarizing filter 30 is interposed in the cockpit 22 in a line of sight (indicated by an imaginary line 34) between the occupant and reflections 36 off the reflective interior surface 27 of the canopy 26 which initiate at the lighted display 28 as light rays 38. The polarizing filter 32 is thereby effective to prevent the reflections 36 from being seen by the occupant without affecting the ability of the occupant to see the lighted display.

In order to optimize the capability of the system 20, the polarizing filters 30, 32 preferably lie in substantially parallel spaced planes.

Figure 3:
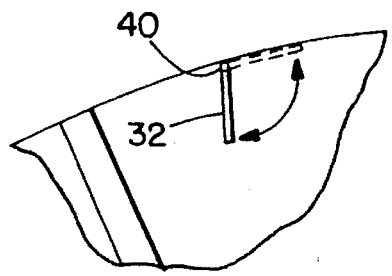
FIG. 3 is a is a detail side elevational view of components certain other components illustrated in FIG. 1 and depicting two positions thereof.
Figure 2:
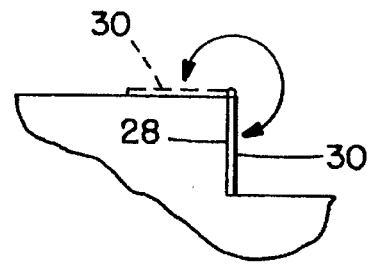
FIG. 2 is a detail side elevational view of components illustrated in FIG. 1 and depicting two positions thereof.

Additionally, preferably, the first polarizing filter 30 is mounted on the frame of the vehicle 24 for movement between an active position overlying the lighted display 28, as indicated by solid lines in FIG. 2, and an inactive position not overlying the lighted display, as indicated therein by dashed lines. In a similar fashion, the second polarizing filter 32 is mounted for movement between an active position, as indicated by solid lines in FIG. 3, interposed in the cockpit in the line of sight between an occupant and reflections off the reflective interior surface of the canopy which initiate at said display and an inactive position, indicated by dashed lines, not so interposed. For this purpose, the filter is suitably hinged as at 40 to the canopy 26.

By reason of the invention, the occupant 29 of the vehicle 24 is able to view the lighted display 28 along a line of sight 42. The filter 30, being in the active (solid line) position and being vertically polarized, for example, allows only light with a vertical component to pass to the occupant 29 along the line of sight 42. The light rays 38 resulting in the reflections 36 are intercepted by the horizontally polarized filter 32 which allows only light with a horizontal component to pass. Since all of the horizontal components of the light from the lighted display 28 were previously filtered out, there is no light from the lighted display (that is, unwanted reflections) visible to the occupant 29.

Figure 4:
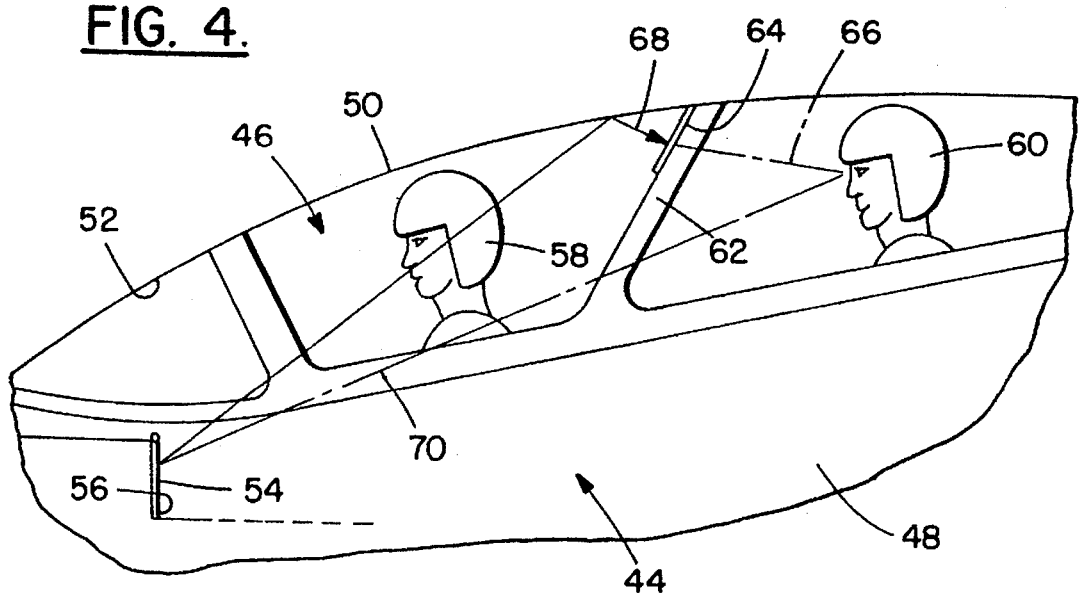
FIG. 4 is a diagrammatic side elevational view, similar to FIG. 1, illustrating the cockpit of a vehicle modified in accordance with another embodiment of the present invention.

Turn now to FIG. 4 for a description of another embodiment of the invention. In this instance, a modified system 44 is provided for eliminating light reflections within a cockpit 46 of a vehicle 48 having a canopy 50 with a reflective interior surface 52. A first polarizing filter 54 overlies a lighted display 56 presenting information of interest to first and second occupants 58, 60 of the vehicle 48. The polarizing filter 54 is preferably of the type which is of the vertically polarized type, that is, it allows only light with a vertical component to pass to be transmitted. The occupants 58, 60 are positioned in a tandem relationship and a transparent substrate 62 in the cockpit separates the occupants. A second polarizing filter 64 is suitably mounted on the transparent substrate. As in the earlier embodiment described, the second polarizing filter 64 is oriented 90° out of phase with respect to the first polarizing filter and is interposed in the cockpit 46 in a line of sight 66 between the second occupant 60 and reflections 68 off the reflective interior surface 52 of the canopy 50 which initiate at the lighted display 56. The second occupant 60 is thereby able to directly view, as indicated by a line of sight 70, the lighted display 56 without seeing reflections therefrom from off the interior surface 52 of the canopy 50.

As in the previous embodiment, the first and second polarizing filters 54, 64 lie in substantially parallel spaced planes. Also, the polarizing filter 54 is mounted for movement between an active position overlying the lighted display 56 and an inactive position not overlying the lighted display; and the second polarizing filter 64 is mounted for movement between an active position interposed in the cockpit in the line of sight 66 between the second occupant 60 and reflections 68 off the reflective interior surface of the canopy which initiate at the lighted display 56 and an inactive position not so interposed. In this latter event, the polarizing filter 64 would not be mounted directly on the transparent substrate 62, but would be positioned proximate thereto when in the active position.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A system for eliminating light reflections within the cockpit of a vehicle having a canopy with a reflective interior surface comprising:

a lighted display presenting information of interest to an occupant of the vehicle;

a first polarizing filter lying in a first plane overlying said lighted display and enabling the occupant of the vehicle viewing said display to read the information presented thereon; and a second polarizing filter lying in a second plane spaced from said first plane and substantially parallel thereto, said second polarizing filter being oriented 90° out of phase with respect to said first polarizing filter and interposed in the cockpit in a line of sight between the occupant and reflections off the reflective interior surface of the canopy which initiate at said display thereby preventing the reflections from being seen by the occupant without affecting the ability of the occupant to see said lighted display.

2. A system as set forth in claim 1
   wherein said first polarizing filter is mounted for movement between an active position overlying the lighted display and an inactive position not overlying the lighted display; and
   wherein said second polarizing filter is mounted for movement between an active position interposed in the cockpit in the line of sight between the occupant and reflections off the reflective interior surface of the canopy which initiate at the display and an inactive position not so interposed.

3. A system for eliminating light reflections within the cockpit of a vehicle having a canopy with a reflective interior surface comprising:

a first polarizing filter lying in a first plane overlying a lighted display presenting information of interest to an occupant of the vehicle and enabling the occupant of the vehicle viewing the display to read the information presented thereon; and a second polarizing filter lying in a second plane spaced from said first plane and substantially parallel thereto, said second polarizing filter being oriented 90° out of phase with respect to said first polarizing filter and interposed in the cockpit in a line of sight between the occupant and reflections off the reflective interior surface of the canopy which initiate at said display thereby preventing the reflections from being seen by the occupant without affecting the ability of the occupant to see the lighted display.

4. A system as set forth in claim 3 wherein said first polarizing filter is mounted for movement between an active position overlying the lighted display and an inactive position not overlying the lighted display; and wherein said second polarizing filter is mounted for movement between an active position interposed in the cockpit in the line of sight between the occupant and reflections off the reflective interior surface of the canopy which initiate at said display and an inactive position not so interposed.

5. A system for eliminating light reflections within the cockpit of a vehicle having a canopy with a reflective interior surface comprising:

a lighted display presenting information of interest to first and second occupants of the vehicle, the occupants being positioned in a tandem relationship;

a first polarizing filter overlying said lighted display enabling both the first and second occupants of the vehicle to view said lighted display to read the information presented thereon;

a second polarizing filter lying in a second plane spaced from said first plane and substantially parallel thereto, said second polarizing filter being oriented 90° out of phase with respect to said first polarizing filter and interposed in the cockpit in a line of sight between the second occupant and reflections off the reflective interior surface of the canopy which initiate at said lighted display enabling the second occupant of the vehicle to directly view said lighted display without seeing reflections therefrom from off the interior surface of the canopy.

6. A system as set forth in claim 5 wherein said first polarizing filter is mounted for movement between an active position overlying the lighted display and an inactive position not overlying the lighted display; and wherein said second polarizing filter is mounted for movement between an active position interposed in the cockpit in the line of sight between the occupant and reflections off the reflective interior surface of the canopy which initiate at the lighted display and an inactive position not so interposed.

7. In a vehicle including a cockpit having a canopy with a reflective interior surface, a system for eliminating light reflections within said cockpit comprising:

a lighted display presenting information of interest to first and second occupants of the vehicle;

a first polarizing filter lying in a first plane overlying said lighted display enabling both the first and second occupants of said vehicle to view said display to read the information presented thereon;

a second polarizing filter lying in a second plane spaced from said first plane and substantially parallel thereto, said second polarizing filter being oriented 90° out of phase with respect to said first polarizing filter and interposed in said cockpit in a line of sight between the second occupant and reflections off the reflective interior surface of the canopy which initiate at said lighted display enabling the second occupant of the vehicle to directly view said lighted display without seeing reflections therefrom off the interior surface of said canopy.

8. A system as set forth in claim 7 wherein said first and second polarizing filters are spaced apart in a generally tandem relationship.

9. A system as set forth in claim 7 wherein said first polarizing filter is mounted for movement between an active position overlying the lighted display and an inactive position not overlying the lighted display; and wherein said second polarizing filter is mounted for movement between an active position interposed in the cockpit in the line of sight between the occupant and reflections off the reflective interior surface of the canopy which initiate at the lighted display and an inactive position not so interposed.

10. A system as set forth in claim 7 including:

a transparent substrate in said cockpit separating the first and second occupants, said second polarizing filter being mounted on said substrate.

* * * * *